1

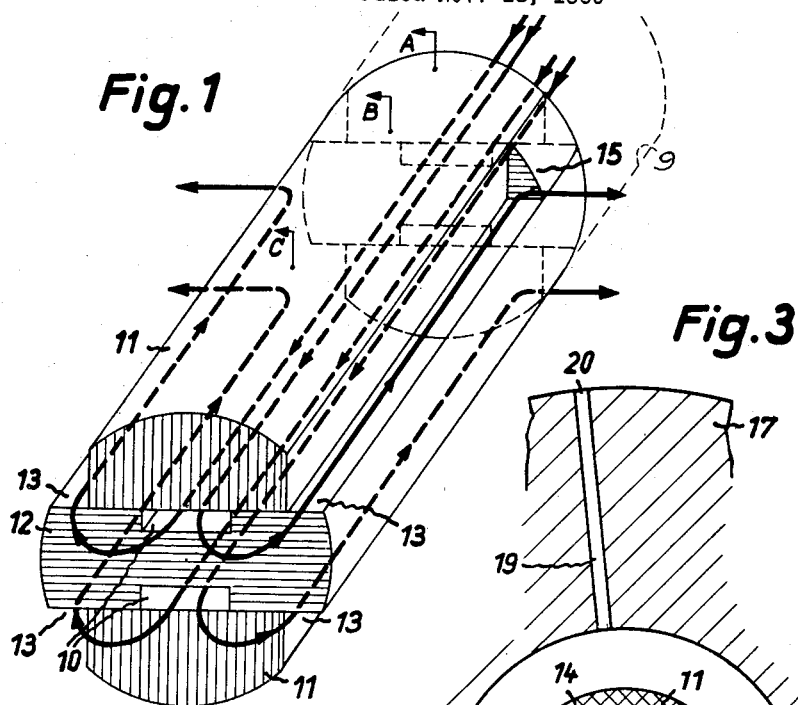
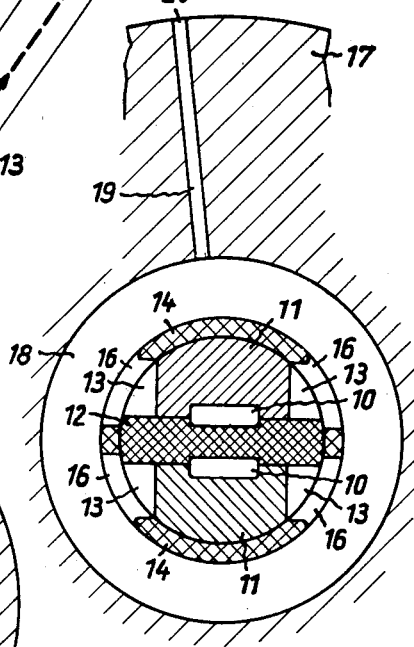
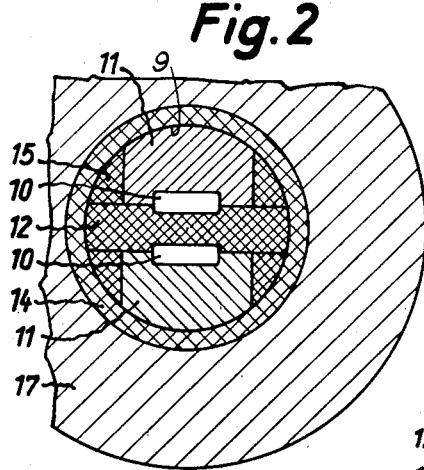
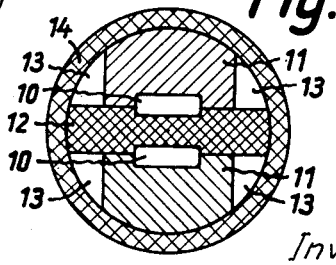
Inventors
Harry Gerwing
Alex Longree
Wolfgang Wollschina
by W. C. Crutcher
Their Attorney United States Patent Office 3,043,901
Patented July 10, 1962

3,043,901
COOLING SYSTEM FOR ELECTRIC CONDUCTORS
IN HOLLOW SHAFTS
Harry Gerwing, Berlin, Alex Longree, Mulheim-Ruhr, and Wolfgang Wollschina, Berlin-Heiligensee, Germany, assignors to Licentia Patent-Verwaltungs G.m.b.H., Frankfurt am Main, Germany
Filed Nov. 18, 1960, Ser. No. 70,282
Claims priority, application Germany Nov. 20, 1959
6 Claims. (Cl. 174—15)

The invention relates to a device for the direct cooling of electric conductors in a hollow shaft, particularly electric conductors in hollow parts of shafts in electric machines such as slip ring connections in the hollow parts of shafts in turbo-generators.

Effective direct cooling of the windings of electric machines, for example with a gas such as hydrogen, or with a suitable liquid such as oil or water, makes possible a higher efficiency of the machine. In the case of maximum output turbine-generators, this involves an increase of the exciting current which, however, entails—with the same cross-section of the conductor—considerably stronger heating, due to ohmic losses, of slip ring connections in the bore hole of the shaft not reached by the intensified direct cooling of the windings. This heating at first is counteracted by increasing the cross-section of the conductors, but this is soon limited by the available cross-section of the bore hole and the minimum thickness of the insulation between the conductors and between conductor and hollow shaft.

A further increase of the exciting current requires cooling of the conductors located in the hollow shaft because the insulation between the conductors and the hollow shaft poorly dissipates the heat loss.

Arrangements are known where, in order to prevent the formation of condensed water, an air stream is directed through channels bound on one side by the tunnel wall and, on the other side, by the profiled insulation strips which hold the conductor of comparatively small cross-section in its position and insulate it towards the shaft. This arrangement may be sufficient to prevent the formation of condensed water, cooling of the conductors however is not intended because there is no need for it, in view of the small cross-sections of the conductors and the low current loads.

Another arrangement provides for larger cross-sections of the conductors, several cooling channels bound by the conductors and the insulation between conductors or between conductor and hollow shaft. For the cooling gas flow, the cooling channels of both conductors are connected in tandem. At one end of the conductor, the fresh cooling gas enters the cooling channels provided for one conductor. At the end of this conductor, the heated cooling gas stream leaving the cooling channels of this particular conductor is distributed into other cooling channels of the same conductor and into the cooling channels of the other conductor arranged exactly as at the first conductor, and flows back in same to the end of the conductor where it entered. The distances to be traveled by the cooling gas in the channels of the other conductor differ in length and the cooling gas stream in the channels thus has to overcome different degrees of friction. Less cooling gas than through the shorter cooling gas channels will flow through the longer cooling gas channels formed, due to the fact that the cooling gas upon reaching the end at the entry side flows back again in other channels to the outlets which, in the axial direction, are closer to the center of the conductor.

2

The cooling channels of the individual conductors thus come in contact with cooling gas of different temperatures. The gas is first heated up in the channels of one conductor and cool this conductor well, whereupon it flows through the channels of the other conductor from which is removes less heat, due to the small difference in temperature of gas and conductor.

In the corresponding cooling channels of both conductors, due to the different pressure conditions, different amounts of cooling gas flow during the time unit.

The disadvantage of this arrangement thus is a different degree of cooling of the conductors. With a high current load in the conductors which nearly completely fill the shaft tunnel, such thermal unbalance leads to disturbances in the quiet running of the machine and therewith reduces safety in operation.

The invention eliminates all these drawbacks. The corresponding cooling channels of the conductors separated by insulation are connected in parallel and carry coolant streams of the same temperature. Since all corresponding cooling channels are of equal length, the pressure drop also is everywhere the same because, according to one characteristic of the invention, the coolant leaves the cooling channels nearly at the same end where it enters other cooling channels. Each coolant particle travels a distance in the cooling channels which is about twice the length of one conductor. The coolant particles, after having traveled at least one length of the conductor in the parallel-supplied cooling channels for the coolant admission belonging to the individual conductors and located immediately near the axis, are redirected upon reaching the end of the conductor and flow back again in the cooling channels for the coolant discharge, which are removed from the axis, to the conductor end at the entry side, where they leave the cooling channels through release openings.

These release openings are, preferably by means of angular chambers and channels, connected with exit openings in the shaft, where the coolant leaves the cooling system and which have a radial distance from the shaft axis as long as possible. The entry openings from which the coolant flows to the cooling channels for the coolant feed are arranged as closely to the shaft axis as the construction permits. The great radial distance between entry and release openings thus obtained assures high conveyance pressure for the coolant and thus contributes to intensive cooling. This is because the rotating shaft acts like a pump in moving fluid from a lesser radius to a greater radius.

An example of an embodiment of this invention is shown in the figures.

FIG. 1 is a perspective view of two conductors separated by insulation. The insulation which insulates the conductor against the shaft and the hollow shaft itself are not shown.

FIG. 2 is a cross-section through the hollow shaft at the conductor end at the entry side at A.

FIG. 3 is a cross-section through the hollow shaft at the conductor end at the entry side at B.

FIG. 4 is a cross-section through the hollow shaft approximately at C.

The arrows in FIG. 1 indicate the coolant flow. Coolant is supplied from a common passage 9 lying along the shaft axis, as indicated by the dashed outline. The coolant enters at one conductor end into the parallel-supplied corresponding cooling channels 10 which are close to the axis, and are formed by the conductors 11 and the insulation 12 between them. When the coolant has traveled through cooling channel 10 to the other conductor end and has cooled both conductors evenly, it leaves them and is distributed in equal amounts into the corresponding cooling channels 13 which are more removed from the axis and are bound by conductors 11 and insulation 14 (FIGS. 2-4). Thus, an admission channel 10 supplies two discharge channels 13 in parallel. In these parallel-supplied cooling channels 13 for the coolant removal, the coolant flows back to the end of conductor 11 at the entry side and thereby also cools all conductors evenly.

According to one characteristic of the invention, the directing of the coolant flow requires very few fillers or separators. At the end of the conductor on the entry side, fillers 15 close the cooling channels 13 towards the outside. Through release openings 16 in insulation 14 between conductors 11 and hollow shaft 17 (FIG. 3), the coolant streams leave the cooling channels 13 and merge in the annular space 18 provided in the hollow shaft 17. The radial channels 19 which may be present in any number are located in a coolant discharge flange and connect annular space 18 with the outlets 20 located at the outermost periphery.

The radial distance of the discharge openings from the shaft axis is about twice or several times the distance of the entry openings. The entry and discharge openings thus have a great radial distance from each other, which determines the pumping pressure exerted upon the coolant. The greater this distance, the greater is the amount of coolant flowing through the cooling channels per time unit and the more effective is therefore also the cooling of the conductor.

What we claim as new and desire to secure by Letters Patent of the United States is:

1. A conductor cooling arrangement comprising a hollow rotatable shaft, at least two conductors disposed in said shaft, first insulating means disposed near the shaft axis and separating said conductors, second insulating means surrounding said conductors to insulate them from the shaft, first parallel conduit means defined between the conductors and the first insulating means adjacent and symmetrical with respect to the shaft axis, second parallel conduit means symmetrical with respect to the shaft axis and defined in part between the conductors and the second insulating means, third conduit means connecting said first and second conduit means at one end of the conductors, and common passage means supplying coolant to said first conduit means, whereby corresponding parts of the separated conductors are in contact with coolants at substantially the same temperature.

2. A conductor cooling arrangement comprising a rotatable member defining a generally cylindrical recess along its axis, at least two parallel conductors disposed in said recess, first insulating means disposed near the axis of the recess and separating said conductors, second insulating means surrounding said conductors and insulating them from the peripheral wall of the recess, first parallel conduit means defined between the conductors and opposite sides of the first insulating means adjacent and symmetrical with the axis of the recess, second parallel conduit means defined in part between the conductors and the second insulating means and symmetrical with the recess axis at a distance therefrom greater than that of the first conduit means, third conduit means connecting said first and second conduit means at one end of the conductors, and common passage means supplying coolant to the other end of said first conduit means whereby substantially the same pressure drop is maintained along corresponding parts of the parallel cooling conduit means.

3. A conductor cooling arrangement comprising a hollow rotatable shaft, at least two parallel conductors disposed axially in said shaft, first insulating means disposed near the shaft axis and separating said conductors, second insulating means surrounding said conductors to insulate them from the shaft, first parallel conduit means defined between the conductors and the first insulating means symmetrical with and adjacent the shaft axis, second parallel conduit means defined at least in part between the conductors and the second insulating means and symmetrical with the shaft axis at a distance therefrom greater than that of the first conduit means, third conduit means connecting said first and second conduit means at one end of the conductors, first common passage means supplying coolant to the other end of said first conduit means whereby the coolant is fed close to the shaft axis, and second common passage means for removing the coolant from the second conduit means substantially at the same end portion of the conductors where the coolant enters.

4. A conductor cooling arrangement comprising a hollow shaft, a tube of insulation disposed in said hollow shaft, first and second conductors disposed in said insulating tube and having a smaller aggregate cross-section than the interior of said tube, an insulating strip separating said first and second conductors and insulating them from one another, first parallel conduit means symmetrical with the shaft axis and defined between the first and second conductors and the insulating strip on either side thereof and adjacent the shaft axis, second parallel conduit means symmetrical with the shaft axis and defined at least in part between the first and second conductors and the insulating tube at a radius from the shaft axis greater than that of the first conduit means, third conduit means connecting each of said first conduit means to one of said second conduit means at one end of the conductors, and common passage means supplying coolant to said first conduit means at the other end thereof, whereby corresponding adjacent parts of the separated conductors are in contact with coolant at substantially the same temperatures respectively.

5. A conductor cooling arrangement comprising a hollow rotatable shaft, an insulating tube disposed in said shaft, first and second conductors disposed in said insulating tube symmetrical with the shaft axis and having a smaller cross-section than the interior of the insulating tube, a diametrically extending insulating strip disposed along the shaft axis and separating said first and second conductors, first parallel conduit means defined between the first and second conductors and the insulating strip on either side thereof adjacent and symmetrical with the shaft axis, second parallel conduit means defined at least in part between the conductors and the second insulating means and symmetrical with the shaft axis at a radius therefrom greater than that of the first conduit means, third conduit means connecting each of said first conduit means to one of said second conduit means at one end of the conductors, and common passage means supplying coolant to said first parallel conduit means at the other end of the conductors, whereby substantially the same pressure drop is maintained along corresponding adjacent parts of the coolant conduit means while the difference in radial location of the first and second conduit means provides a centrifugal force effect to circulate the coolant.

6. A conductor cooling arrangement comprising a hollow rotatable shaft, an insulating tube disposed in said shaft, first and second conductors disposed in said insulating tube and symmetrical with the shaft axis, an insulating strip disposed on the shaft axis and sealingly engaging the insulating tube on opposite sides thereof, first and second conduit means defined by the first and second conductors respectively with the insulating strip adjacent and symmetrical with the shaft axis, third, fourth, fifth and sixth conduit means symmetrical with and at a radius from the shaft axis greater than that of the first and second conduit means, each of said third, fourth, fifth, and sixth conduit means being defined between the insulating tube, one of said conductors, and the insulating strip, seventh conduit means connecting all of said other conduit means at one end of the conductors, common passage means supplying coolant in parallel to said first and second conduit means at the other end of the conductors, and means withdrawing coolant from the same end as it enters, whereby the coolant enters the first and second conduit means substantially at one end of each conductor and close to the axis of the shaft and leaves the third, fourth, fifth and sixth conduit means substantially at the inlet end of the conductor but at a greater radius from the shaft axis than the first and second conduit means, whereby centrifugal force aids in circulating the coolant.

References Cited in the file of this patent

UNITED STATES PATENTS 2,727,161 Kilner et al. _____ Dec. 13, 1955

FOREIGN PATENTS 777,468 Great Britain _____ June 26, 1957